United States Patent
Wang et al.

(10) Patent No.: US 12,224,901 B2
(45) Date of Patent: Feb. 11, 2025

(54) NETWORK MANAGEMENT AND CONTROL METHOD AND SYSTEM, NETWORK SYSTEM, AND STORAGE MEDIUM

(71) Applicant: ZTE CORPORATION, Shenzhen (CN)

(72) Inventors: Dajiang Wang, Shenzhen (CN); Qilei Wang, Shenzhen (CN); Zhenyu Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/552,332

(22) PCT Filed: Nov. 24, 2021

(86) PCT No.: PCT/CN2021/132834
§ 371 (c)(1),
(2) Date: Sep. 25, 2023

(87) PCT Pub. No.: WO2022/199089
PCT Pub. Date: Sep. 29, 2022

(65) Prior Publication Data
US 2024/0195683 A1      Jun. 13, 2024

(30) Foreign Application Priority Data
Mar. 26, 2021   (CN) .......................... 202110326389.9

(51) Int. Cl.
*H04L 41/0806*   (2022.01)
*H04L 41/082*   (2022.01)
(Continued)

(52) U.S. Cl.
CPC ........ *H04L 41/0806* (2013.01); *H04L 41/082* (2013.01); *H04L 41/122* (2022.05); *H04L 41/16* (2013.01)

(58) Field of Classification Search
CPC ... H04L 41/0806; H04L 41/12; H04L 41/122; H04L 41/082; H04L 41/16
See application file for complete search history.

(56) References Cited

U.S. PATENT DOCUMENTS 11,144,042 B2 * 10/2021 Thomsen ................ G06F 1/163
11,323,326 B2 *  5/2022 Kommula ............. H04L 41/145
(Continued)

FOREIGN PATENT DOCUMENTS

CN    110855503 A    2/2020
CN    111652415 A    9/2020
(Continued)

OTHER PUBLICATIONS

International Searching Authority. International Search Report and Written Opinion for PCT Application No. PCT/CN2021/132834 and English translation, mailed Mar. 2, 2022, pp. 1-10.
(Continued)

*Primary Examiner* — Rachel J Hackenberg
(74) *Attorney, Agent, or Firm* — Vivacqua Crane, PLLC

(57) ABSTRACT

A network management and control method and system, a network system, and a storage medium are disclosed. The network management and control method may include: acquiring Digital Twin (DT) model data corresponding to physical objects in a physical network (S110); generating, according to the DT model data, DT cases at different levels, wherein the levels of the DT cases correspond to levels of the physical objects, and the DT cases at different levels have a functionally collaborative relationship (S120); obtaining a target analysis result according to the collaborative relationship and all the DT cases (S130); and generating network configuration information according to the target analysis result, and delivering the network configuration information to the physical network so that the physical (Continued)

network implements network management and control according to the network configuration information (S140).

18 Claims, 9 Drawing Sheets

(51) Int. Cl.
*H04L 41/122* (2022.01)
*H04L 41/16* (2022.01)

(56) References Cited

U.S. PATENT DOCUMENTS

| | | |
|---|---|---|
| 2016/0337200 A1 | 11/2016 | Wei et al. |
| 2020/0097493 A1 | 3/2020 | Gawrys et al. |
| 2020/0265329 A1 | 8/2020 | Thomsen et al. |
| 2021/0248825 A1* | 8/2021 | McBain ............... G06F 30/13 |
| 2021/0311718 A1* | 10/2021 | Sinha ................ H04L 12/4641 |
| 2022/0156433 A1* | 5/2022 | Laane ............. G05B 19/41885 |
| 2023/0124264 A1* | 4/2023 | Nixon ............. G05B 19/41865 700/99 |

FOREIGN PATENT DOCUMENTS

| | | |
|---|---|---|
| CN | 111835565 A | 10/2020 |
| CN | 112306658 A | 2/2021 |
| JP | 2000295242 A | 10/2000 |
| JP | 2016111648 A | 6/2016 |
| JP | 2017506843 A | 3/2017 |

OTHER PUBLICATIONS

European Patent Office. Extended European Search Report for EP Application No. 21932697.2, mailed Aug. 5, 2024, pp. 1-32.
Internet Research Task Force. "Concepts of Digital Twin Network draft-zhou-nmrg-digitaltwin-Network-concepts-03," Network Working Group Internet Draft, Feb. 2021.
Nguyen, H., et al. "Digital Twin for 5G and Beyond," IEEE Communications Magazine, vol. 59, No. 2, Feb. 2021, pp. 10-15.
Wang, D., et al. "The Role of Digital Twin in Optical Communication: Fault Management, Hardware Configuration, and Transmission Simulation," IEEE Communications Magazine, vol. 59, No. 1, Jan. 2021, pp. 133-139.
Industrial Property Cooperation Center (IPCC). Search Report for JP Application No. 2023-558761 and English translation, mailed Sep. 25, 2024, pp. 1-27.
Japan Patent Office. Notice of Reasons for Refusal for JP Application No. 2023-558761 and English translation, mailed Oct. 24, 2024, pp. 1-6.

* cited by examiner

Generate, according to the DT model data and levels of the physical objects, the DT cases in target DT case containers having different container levels, where the target DT case containers are determined from preset DT case containers according to the management and control scenario and the levels of the physical objects, the DT case containers are configured for generating and managing DT cases, and the DT cases generated by the DT case containers having different container levels correspond to different levels — S310

FIG. 3

Perform, according to the collaborative relationship and the container levels corresponding to the target DT case containers, AI algorithm-based processing on a DT case generated by a target DT case container having a lower container level to obtain an intermediate analysis result; report the intermediate analysis result to a target DT case container having a higher container level; and perform, according to the intermediate analysis result, the AI algorithm-based processing on a DT case generated by the target DT case container having the higher container level to obtain a collaborative analysis result — S410

Determine a collaborative analysis result obtained from a target DT case container having a highest container level as the target analysis result — S420

FIG. 4

Determine a target AI algorithm from a preset AI algorithm library according to the management and control scenario — S510

Analyze and process the DT case according to the target AI algorithm — S520

FIG. 5

NETWORK MANAGEMENT AND CONTROL METHOD AND SYSTEM, NETWORK SYSTEM, AND STORAGE MEDIUM

CROSS-REFERENCE TO RELATED APPLICATION

This application is a national stage filing under 35 U.S.C. § 371 of international application number PCT/CN2021/132834 filed on Nov. 24, 2021, which claims priority to Chinese patent application No. 202110326389.9 filed Mar. 26, 2021. The contents of these applications are incorporated herein by reference in their entirety.

TECHNICAL FIELD

The present disclosure relates to, but not limited to, the field of network communication, and in particular to a network management and control method and system, a network system, and a storage medium.

BACKGROUND

With the development of communication technologies, transmission networks are facing the issues of diversified resources, wide coverage, and complex deployment environments. Also, with the advent of the digital transformation era, transmission services are developing rapidly toward higher service agility and virtualization of network functions. Considering the increasing complexity and diversity of hardware devices and digital technologies in transmission networks, a high-efficiency intelligent management of network self-optimization, self-healing, and autonomy needs to rely on a systematic, accurate, and real-time digital analysis technology to abstract a digital model of a complex network system and build a multi-dimensional network digital simulation system that can integrate the actual network system, an operation mechanism, as well as management and control maintenance methods. In addition, an Artificial Intelligence (AI) technology needs to be used to implement the real-time dynamic feedback, evaluation optimization, simulation, and prediction of the operational status of the actual physical network, to provide a basis for digital analysis in the high-efficiency intelligent network management.

The Digital Twin (DT) technology can create a high-fidelity digital virtual model of a physical object, simulate the behavior of the physical object, and depict the operational status of the physical object, thereby achieving the fusion of digital information and the physical object. When the DT technology is applied to network communication, required network data can be extracted from the transmission network, and a DT case model can be built by utilizing the AI technology according to the requirements, so as to realize the functions of analysis, optimization, simulation, and prediction of the transmission network.

In practical applications, DT cases at different levels need to be built for different analysis objects, and the transmission network is intelligently controlled according to a result of analysis of the DT cases. However, in the transmission network, objects corresponding to DT cases at different levels may be associated with each other. For example, a fault of a functional module is a root cause of an alarm or interruption in the transmission network. Therefore, how to consider the collaborative relationship between DT cases at different levels is crucial to improving the dynamic detection capability and the digital analysis capability of the network system.

SUMMARY

The following is a summary of the subject matter set forth in the description. This summary is not intended to limit the scope of protection of the claims.

Embodiments of the present disclosure provide a network management and control method and system, a network system, and a storage medium, to improve the dynamic detection capability and the digital analysis capability of the network system.

In accordance with a first aspect of the present disclosure, an embodiment provides a network management and control method, which is applied to a network management and control system. The network management and control method may include: acquiring DT model data corresponding to physical objects in a physical network; generating, according to the DT model data, DT cases at different levels, where the levels of the DT cases correspond to levels of the physical objects, and the DT cases at different levels have a functionally collaborative relationship; obtaining a target analysis result according to the collaborative relationship and all the DT cases; and generating network configuration information according to the target analysis result, and delivering the network configuration information to the physical network so that the physical network implements network management and control according to the network configuration information.

In accordance with a second aspect of the present disclosure, an embodiment provides a network management and control method, which is applied to a data acquisition apparatus communicatively connected to a network management and control system. The network management and control method may include: generating DT model data corresponding to physical objects in a physical network; sending the DT model data to the network management and control system, so that the network management and control system generates network configuration information according to the DT model data, and delivering the network configuration information to the physical network, so that the physical network implements network management and control according to the network configuration information, where the network configuration information is generated by the network management and control system according to a target analysis result, the target analysis result is obtained by the network management and control system according to a collaborative relationship and all DT cases at different levels, the DT cases at the different levels are generated by the network management and control system according to the DT model data, the levels of the DT cases correspond to levels of the physical objects, and the DT cases at the different levels have a functionally collaborative relationship.

In accordance with a third aspect of the present disclosure, an embodiment provides a network management and control system. The system may include a memory, a processor, and a computer program stored in the memory and executable by the processor which, when executed by the processor, causes the processor to implement the network management and control method in accordance with the first aspect.

In accordance with a fourth aspect of the present disclosure, an embodiment provides a network system. The network system may include a network management and control system, and a data acquisition apparatus. The network management and control system is communicatively connected to the data acquisition apparatus. The network management and control system is configured for executing the network management and control method in accordance with the first aspect. The data acquisition apparatus is configured for executing the network management and control method in accordance with the second aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims, and accompanying drawings.

BRIEF DESCRIPTION OF DRAWINGS

The drawings are provided for understanding of the technical schemes of the present disclosure, and constitute a part of the description. The drawings and the embodiments of the present disclosure are used to illustrate the technical schemes of the present disclosure.

FIG. 3 is a flowchart of generating DT cases according to another embodiment of the present disclosure;

FIG. 4 is a flowchart of obtaining a target analysis result according to another embodiment of the present disclosure;

FIG. 5 is a flowchart of AI algorithm-based processing according to another embodiment of the present disclosure;

DETAILED DESCRIPTION

Figure 1:
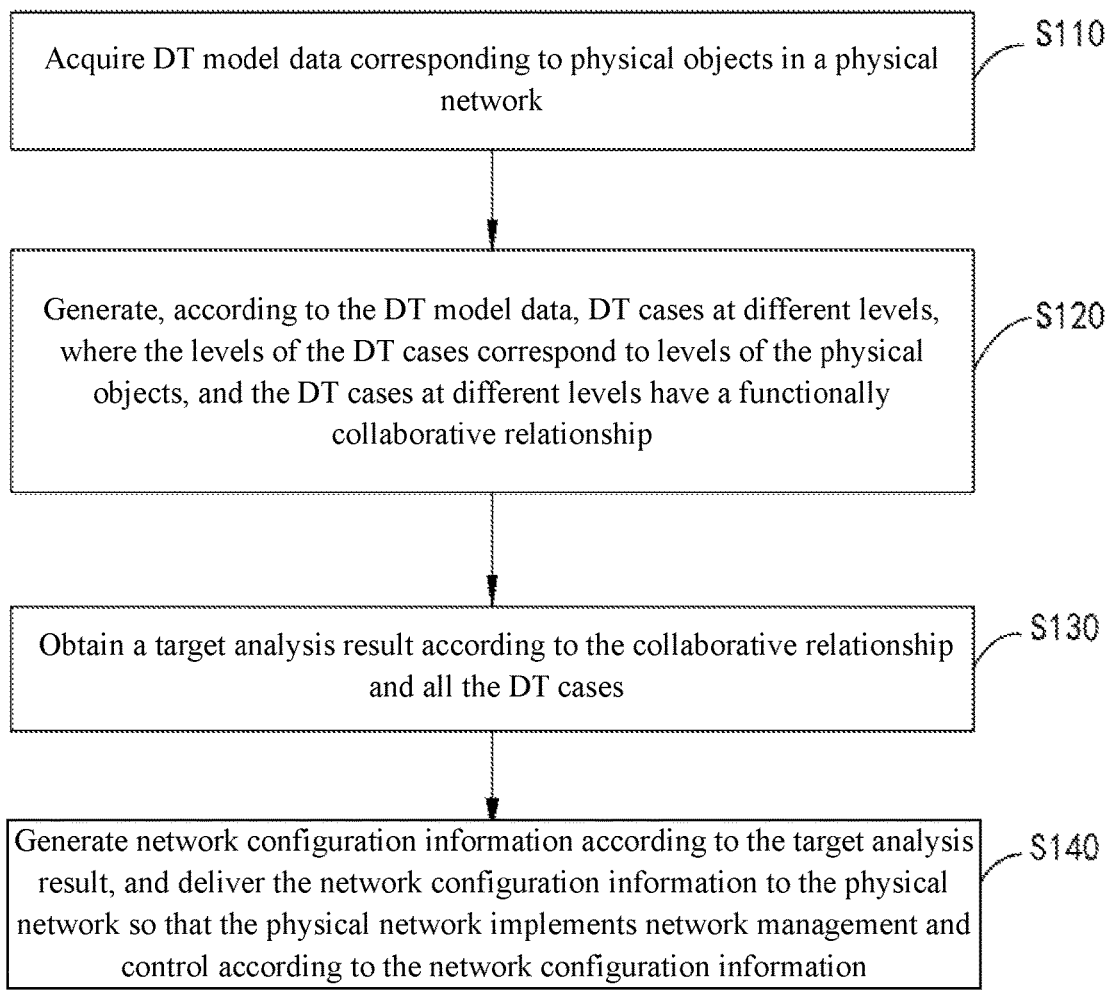
FIG. 1 is a flowchart of a network management and control method applied to a network management and control system according to an embodiment of the present disclosure.

To make the objects, technical schemes, and advantages of the present disclosure clear, the present disclosure is described in detail in conjunction with the accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a network management and control method and system, a network system, and a storage medium. The network management and control method includes: acquiring DT model data corresponding to physical objects in a physical network; generating, according to the DT model data, DT cases at different levels, where the levels of the DT cases correspond to levels of the physical objects, and the DT cases at different levels have a functionally collaborative relationship; obtaining a target analysis result according to the collaborative relationship and all the DT cases; and generating network configuration information according to the target analysis result, and delivering the network configuration information to the physical network so that the physical network implements network management and control according to the network configuration information. According to the scheme provided by the embodiments of the present disclosure, network management and control can be implemented according to the DT cases and the collaborative relationship, thereby improving the dynamic detection capability and the digital analysis capability of the network system.

It should be noted that the network management and control method provided by the embodiments of the present disclosure can be applied to any network system, such as an Optical Transport Network (OTN), a Packet Transport Network (PTN), and a Packet Optical Transport Network (POTN). For the sake of simplicity of description, the embodiments of the present disclosure take the application to an OTN system as an example to illustrate the technical scheme. However, this shall not be construed as limiting the protection scope of the present disclosure, and those having ordinary skills in the art can also apply the technical scheme of the embodiments of the present disclosure to other network systems.

It should be noted that the network management and control system may be an apparatus including a plurality of functional modules. For example, to realize a management and control function, functional modules such as a database, a processor, and an executor may be set in the network management and control system according to actual requirements. The specific apparatus type can be determined according to the specific network system. For example, for a Hierarchical Digital Twin OTN (HDTON), the network management and control system may be an HDTON intelligent management and control system for managing and controlling the HDTON. In addition, to realize the generation of DT cases, an HDTON case orchestrator may be set as a controller and a Software Defined Optical Network (SDON) system may be set as an executor in the HDTON intelligent management and control system. In addition, for different management and control scenarios, an AI algorithm engine library storing a plurality of preset AI algorithms is set. The SDON system, HDTON case orchestrator, and the AI algorithm engine library may be an independent apparatus in actual network deployment, respectively, and may be set in different physical apparatuses or physical devices, as long as they can be functionally combined into a network management and control system. It should be noted that the above apparatus is merely an example for illustrating the network management and control system, and those having ordinary skills in the art have the motivation to add or delete corresponding functional modules in the network management and control system according to actual requirements, which is not limited in the embodiments.

The embodiments of the present disclosure will be described in detail below in conjunction with the accompanying drawings.

As shown in FIG. 1, an embodiment of the present disclosure provides a network management and control method, which is applied to a network management and control system. The network management and control method includes, but not limited to, the following steps.

At S110, DT model data corresponding to physical objects in a physical network is acquired.

It should be noted that the physical network can be any network system, as long as the physical objects at different levels in the physical network have a subordinate relationship and have a functionally collaborative relationship. For example, for an OTN system, an ODU service of the entire network is composed of a plurality of Optical Data Units (ODUs), and a prediction result of traffic throughput of an ODU node has certain impact on the optimization and simulation of the ODU service of the entire network. Therefore, prediction of the traffic throughput of each ODU node needs to be comprehensively considered during the optimization and simulation of the ODU service of the entire network. The physical network using the network management and control method is not limited in this embodiment.

It can be understood that the physical object can be a specific physical device or a system composed of multiple physical devices. For example, for an OTN system, the physical object can be an OTN, an optical module in an OTN, or every ODU node in an OTN. The physical object can be determined according to specific requirements.

It should be noted that the specific content of the DT model data can be determined according to the actual required physical object. For example, when a fault analysis of optical modules in the OTN network is required, the acquired DT model data can include an OTN network topology, an Optical Channel (OCH) optical layer service distribution in the entire OTN network topology, and optical module data on each Reconfigurable Optical Add-Drop Multiplexer (ROADM) node in the OTN network topology. The specific type of the DT model data is not limited in this embodiment.

It should be noted that the DT model data can be acquired from the physical network by the network management and control system according to specific data requirements. Based on the DT technology, corresponding parameters and attributes can be extracted from the physical network, to build a high-fidelity digital virtual model, thereby forming the DT model data. In this way, the DT model data can reflect the real operational status of the physical network in real time, thereby improving the accuracy of evaluation and prediction of the network system.

At S120, DT cases at different levels are generated according to the DT model data, where the levels of the DT cases correspond to levels of the physical objects, and the DT cases at different levels have a functionally collaborative relationship.

It should be noted that a level of a DT case can represent a scale or influence range of a physical object in the physical network corresponding to the DT case. For example, for an OTN system, a physical object at a highest level can be the entire OTN network, and a physical object at a lowest level can be an optical module in the OTN network. The specific correspondence between the scales and the values of levels of the physical objects can be adjusted according to actual requirements, which is not limited herein.

It should be noted that the level of the generated DT case corresponds to the level of the physical object. For example, when the physical object is the OTN network, which is at a network level, the level of the DT case generated corresponding to the OTN network according to the DT model data is also a network level.

It should be noted that in the physical network, physical objects of different scales usually have a subordinate relationship, that is, a physical object corresponding to a DT case at a higher level is usually formed by assembling or combining physical objects corresponding to DT cases at a lower level. For example, a physical object corresponding to a DT case at a higher level is a ROADM node, a physical object corresponding to a DT case at a lower level is an optical module, and the ROADM node is usually composed of optical modules. Therefore, physical objects having a subordinate relationship also have a functionally collaborative relationship. For example, predictive analysis of a DT case corresponding to a ROADM node needs to take into consideration a result of fault prediction of optical modules belonging to the ROADM node. Through the collaborative relationship, analysis results of DT cases at a lower level can be comprehensively considered during the predictive analysis of a DT case at a higher level, so that the final target analysis result is more accurate.

It should be noted that the DT cases may be generated after the DT model data is acquired, to ensure that there is a corresponding DT case in the process of collaborative analysis. Details will not be repeated below.

At S130, a target analysis result is obtained according to the collaborative relationship and all the DT cases.

It should be noted that, because the DT cases can be maintained in a running state after being generated, a predictive analysis may be performed for each DT case first, and then a nested analysis is performed according to the collaborative relationship to obtain the target analysis result. Alternatively, a comprehensive analysis may be performed for a DT case at a higher level after the DT case at the higher level receives an analysis result reported by a DT case at a lower level, and an analysis result obtained for a DT case at the highest level is used as the target analysis result. In other words, a collaborative analysis is implemented based on a trigger mechanism. The specific method can be selected according to actual requirements, as long as a collaborative analysis among DT cases can be achieved.

It should be noted that in practical applications, DT cases corresponding to physical objects having a subordinate relationship usually have a collaborative relationship. For example, an optical module fault in an existing network is often a root cause of a fault alarm and service interruption in the OTN network caused by the optical module fault. In practice, such a collaborative and interference relationship between a local part and the entire existing network is also reflected in a Digital Twin OTN (DTON), so there is a collaborative relationship between network-level fault analysis DT cases and optical module-level fault prediction DT cases.

At S140, network configuration information is generated according to the target analysis result, and is delivered to the physical network so that the physical network implements network management and control according to the network configuration information.

It should be noted that the physical network is usually a collection of physical devices, and needs to be managed and controlled by a commonly used intelligent management and control system. For example, the physical network is controlled by a commonly used SDON system. The specific intelligent management and control system is not limited in this embodiment.

It can be understood that the network configuration information can be any type of information that can enable the physical network to implement network management and control by adjusting operational parameters. For example, for an OTN system, when the target analysis result is ODU service cutover rerouting optimization in the entire network, the SDON system may generate corresponding network configuration information according to processing requirements such as rerouting optimization of related services and node expansion for the current OTN network.

Figure 2:
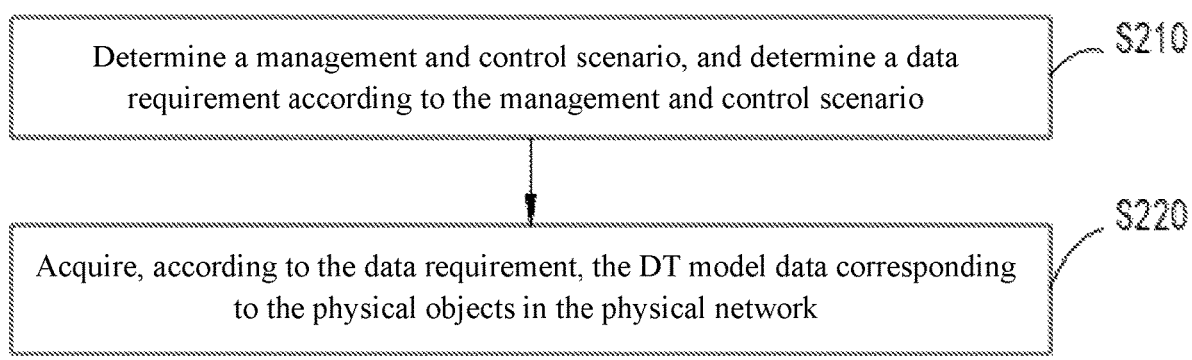
FIG. 2 is a flowchart of acquiring DT model data according to another embodiment of the present disclosure.

In addition, referring to FIG. 2, in an embodiment, S110 in the embodiment shown in FIG. 1 further includes, but not limited to, the following steps.

At S210, a management and control scenario is determined, and a data requirement is determined according to the management and control scenario.

At S220, the DT model data corresponding to the physical objects in the physical network is acquired according to the data requirement.

It should be noted that the management and control scenario may be a scenario that needs to reflect a network management and control requirement, such as a network service scenario that reflects a user service requirement or a network analysis scenario that reflects a physical network detection and analysis requirement, which is not limited in this embodiment.

It should be noted that a physical object of which data needs to be acquired can be determined according to the management and control scenario, so that a specific data requirement can be determined, thereby improving the efficiency of data processing. For example, when the management and control scenario is determined as an OTN network traffic analysis scenario, DT model data of OTN network traffic needs to be acquired from the physical network, where the DT model data may include an OTN network topology, an ODU service distribution on the entire network topology, traffic throughput of each node, etc. After the data requirement is determined, a level of a DT case to be built subsequently is further determined. For example, in the OTN network traffic analysis scenario, a network-level DT case corresponding to ODU services of the entire network needs to be built, and node-level DT cases corresponding to all ODU nodes need to be built. The network level and the node level are one of the examples of the levels, and are not intended to limit the specific selection of the levels.

It can be understood that to further reflect the levels corresponding to the physical objects, the DT model data may be built in the form of Hierarchical Digital Twin (HDT) model data. In the HDT model data, levels of the data are predetermined according to the values of the levels of the physical objects. For example, in the OTN network traffic analysis scenario, the OTN network topology and the ODU service distribution on the entire network topology are determined as network-level data, and the traffic throughput of each node is determined as node-level data. In this way, the levels to which the DT case containers of different data belong can be quickly determined from the HDT model data.

In addition, referring to FIG. 3, in an embodiment, S120 in the embodiment shown in FIG. 1 further includes, but not limited to, a following step.

At S310, the DT cases are generated in target DT case containers having different levels according to the DT model data and levels of the physical objects, where the target DT case containers are determined from preset DT case containers according to the management and control scenario and the levels of the physical objects, the DT case containers are configured for generating and managing DT cases, and the DT cases generated by the DT case containers having different container levels correspond to different levels.

It should be noted that to facilitate the management of DT case containers, an HDTON case orchestrator may be set in the intelligent management and control system, and at least two DT case containers are preset in the HDTON case orchestrator. After the management and control scenario is determined, the HDTON case orchestrator determines a data requirement, and after obtaining DT model data, determines at least two target DT case containers from the preset DT case containers and generates DT cases in the target DT case containers.

It should be noted that the specific container levels may be determined according to actual requirements, as long as DT case containers having different container levels correspond to different levels of DT cases generated by the DT case containers, which is not limited in this embodiment. For example, according to the network level, equipment level and device level among the levels of the DT cases, a high-level DT case container, a middle-level DT case container, and a low-level DT case container are respectively set. Each container level corresponds to one level of physical object.

It should be noted that based on the description of the embodiment shown in FIG. 2, the data requirement may also be determined based on the determined target DT case containers. For example, with reference to the DT case container levels, when it is determined according to the management and control scenario that an analysis needs to be performed from the network level and the device level, corresponding DT cases need to be generated through the high-level DT case container and the low-level DT case container, respectively. In this case, the data requirement may be generated according to data required by each target DT case container. After acquiring the DT model data, each target DT case container acquires the data of the corresponding level from the DT model data and generates the DT case according to the acquired DT model data, thereby ensuring the usability and accuracy of the acquired data.

It should be noted that the DT case container may be used for generating DT cases and may also be used for managing DT cases, for example, analyzing and processing DT cases based on an AI algorithm, or acquiring intermediate analysis results reported by a DT case container having a lower container level for a collaborative analysis. The DT case container may have more or fewer functions for DT cases according to actual requirements, which is not limited in this embodiment.

It should be noted that in different control scenarios, the target DT case containers required are not necessarily different. For example, in some scenarios, all the preset DT case containers need to be used, while in some other scenarios, only DT case containers corresponding to several container levels need to be used, which is determined by the actual requirements of the management and control scenario. The specific number of DT case containers required is not limited in this embodiment.

In addition, referring to FIG. 4, in an embodiment, S130 in the embodiment shown in FIG. 1 further includes, but not limited to, the following steps.

At S410, AI algorithm-based processing is performed, according to the collaborative relationship and the container levels corresponding to the target DT case containers, on a DT case generated by a target DT case container having a lower container level to obtain an intermediate analysis result, the intermediate analysis result is reported to a target DT case container having a higher container level, and the AI algorithm-based processing is performed, according to the intermediate analysis result, on a DT case generated by the target DT case container having the higher container level to obtain a collaborative analysis result.

At S420, a collaborative analysis result obtained from a target DT case container having a highest container level is determined as the target analysis result.

It can be understood that, because physical objects corresponding to DT cases at different levels have a functionally collaborative relationship, and levels of DT cases generated by DT case containers having different container levels are different from each other, the container levels may correspond to the levels of DT cases. In addition, collaborative processing usually uses analysis results obtained for a DT case at a lower level to assist in obtaining an analysis result for a DT case at a higher level. Therefore, the intermediate analysis results may be reported sequentially in an ascending order of container levels. After receives the intermediate analysis result, a target DT case container at a higher container level performs, according to the analysis result, AI algorithm-based processing on the DT case generated by the DT case container, so that the obtained collaborative analysis result includes both the analysis result at the level corresponding to the target DT case container and the analysis result corresponding to the DT case at a lower level having a collaborative relationship with the target DT case container. Therefore, the target analysis result can integrate the collaborative relationship among DT cases corresponding to all the levels involved, thereby improving the dynamic detection capability and the digital analysis capability of the network system.

It should be noted that the higher container level and the lower container level described in S420 are determined according to the collaborative relationship, but not according to the container levels. For example, some control scenarios only involve low-level DT case containers and high-level DT case containers, and correspondingly in S420, the target DT case container having a higher container level is a high-level DT case container, and the target DT case container having a lower container level is a low-level DT case container. For another example, in some control scenarios involving low-level DT case containers, middle-level DT case containers, and high-level DT case containers at the same time. In this example, a target DT case container which performs AI algorithm-based processing on DT cases for the first time is a low-level DT case container, i.e., a target DT case container having a lower container level in the first operation; correspondingly a target DT case container having a higher container level is a middle-level DT case container; similarly, when the middle-level DT case container performs AI algorithm-based processing on DT cases, the middle-level DT case container is a target DT case container having a lower container level, and a high-level DT case container is a target DT case container having a higher container level. After a target DT case container having a highest level completes the AI algorithm-based processing on DT cases, a collaborative analysis result obtained by the target DT case container having the highest level is determined as the target analysis result. This ensures that the collaborative analysis results can be integrated layer by layer, thereby improving the usability of data as a reference.

It can be understood that the collaborative analysis result not only includes the result obtained through AI algorithm-based processing on the corresponding DT case, but also includes all the intermediate analysis results of the lower levels, so that the collaborative analysis result can have richer data.

It should be noted that because the target analysis result may be the collaborative result obtained through AI algorithm-based processing performed on the DT cases by the target DT case container having the highest level, the DT case container having the highest level may inform the SDON system of the target analysis result after obtaining the target analysis result, so that the SDON system generates network configuration information. This ensures that the generated network configuration information can comprehensively consider DT cases at all levels.

It should be noted that in some embodiments, for a DT case container, there may be a plurality of DT case containers having a lower container level. In this case, one DT case container may receive a plurality of intermediate analysis results at the same time. To avoid conflict, a time threshold may be set. To be specific, a DT case container having a higher container level may be in a receiving state within a time period, and after the time period, stops receiving the intermediate analysis results, performs AI algorithm-based processing on DT cases, and integrates all the intermediate analysis results received within the time period. Alternatively, other methods may also be used. For example, each time the DT case container having a higher container level receives an intermediate analysis result during the AI algorithm-based processing on DT cases, the DT case container having a higher container level integrates all the intermediate analysis results again. This is not limited in this embodiment, and the specific judgment manner may be selected according to actual requirements.

In addition, referring to FIG. 5, in an embodiment, S420 in the embodiment shown in FIG. 4 further includes, but not limited to, the following steps.

At S510, a target AI algorithm is determined from a preset AI algorithm library according to the management and control scenario.

At S520, the DT case is analyzed and processed according to the target AI algorithm.

It should be noted that the AI algorithm library can be in the form of a database, as long as the corresponding target AI algorithm can be found based on the management and control scenario. It can be understood that the number of AI algorithms in the AI algorithm library may be arbitrary, and may be increased or decreased according to actual requirements.

It can be understood that the AI algorithm library may include any type of AI algorithm, such as a Reinforcement Learning (RL) algorithm, a Convolution Neural Network (CNN), a Deep Neural Network (DNN), a Graph Convolution Network (GCN), or a Recurrent Neural Network (RNN), and those having ordinary skills in the art have the motivation to increase or decrease the types of AI algorithms according to actual requirements. In addition, the AI algorithms are preset, and the embodiments of the present disclosure does not involve the specific algorithm training process, so the details will not be described herein.

It should be noted that different management and control scenarios require different operations. Therefore, setting multiple AI algorithms in the AI algorithm library and determining the specific target AI algorithm based on the management and control scenario can ensure that the corresponding DT case processing is completed by an optimal AI algorithm. In addition, a correspondence between management and control scenarios and target AI algorithms may be preset. For example, for a user's requirement for an end-to-end OTN high-quality private-line service with intent-based delay optimization, after the scale of the OTN topology is determined according to the management and control scenario, it is determined through matching and analysis that the RL algorithm has an optimal computing effect.

It should be noted that the determination of the target AI algorithm may be performed once when each DT case container performs AI algorithm-based processing on DT cases, to ensure that each DT case container can use the most suitable AI algorithm to process DT cases. Of course, it is also feasible to determine one target AI algorithm for the same collaborative relationship. Each time a DT case container in the collaborative relationship performs AI algorithm-based processing on DT cases, the same target AI algorithm is used. The specific manner may be selected according to actual requirements.

Figures 6, 7, 8:
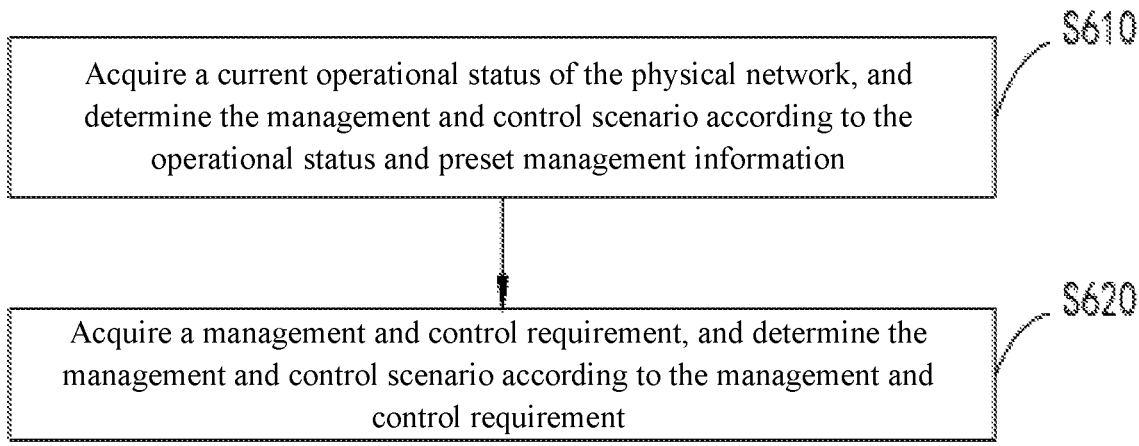
FIG. 6 is a flowchart of determining a management and control scenario according to another embodiment of the present disclosure.
FIG. 7 is a flowchart of synchronizing and updating DT model data according to another embodiment of the present disclosure.
FIG. 8 is a flowchart of acquiring and displaying network status information according to another embodiment of the present disclosure.

In addition, referring to FIG. 6, in an embodiment, S210 in the embodiment shown in FIG. 2 further includes, but not limited to, one of the following steps.

At S610, a current operational status of the physical network is acquired, and the management and control scenario is determined according to the operational status and preset management information; or At S620, a management and control requirement is acquired, and the management and control scenario is determined according to the management and control requirement.

It should be noted that the management and control scenario may include a network analysis scenario and a network service scenario. The network analysis scenario is determined according to a network analysis requirement. The network analysis requirement may be the user's requirement for fault prediction, operational status analysis, or query of the current physical network, and may be generated by the user by sending requirement information to the network management and control system through a client-side. Alternatively, the network analysis requirement may be generated by the network management and control system according to a management goal of self-checking, self-optimization, and self-healing of the physical network, which is not limited in this embodiment.

It can be understood that the network service scenario can be generated based on a service requirement of the user. For example, an OTN intelligent network management and control application (APP) communicatively connected to the network management and control system is set. The OTN intelligent network management and control APP is used to acquire a service requirement of the user for the OTN network. The service requirement may be Bandwidth On Demand (BOD), Multi-Layer Optimization (MLO), Service-Level Agreement (SLA), Optical Virtual Private Network (OVPN), Intent-Based Optical Network (IBON), etc. The specific type of the service requirement may be determined based on actual network resources, and will not be detailed herein.

In addition, referring to FIG. 7, in an embodiment, before S140 in the embodiment shown in FIG. 1 is executed, the method further includes, but not limited to, the following steps.

At S710, when new DT model data reported by the physical network after performing network management and control according to the network configuration information is acquired, the network configuration information is regenerated according to the new DT model data.

It should be noted that after the network management and control is performed according to the network configuration information, a related parameter of a physical object in the physical network changes, i.e., a related parameter in the DT model data also changes. To ensure that the DT model data corresponds to the parameters of the physical objects in the physical network, the DT model data can be updated according to data of a new physical network after the network management and control on the physical network is complete, so that a next DT case generation can be based on the latest DT model data. In addition, by updating the DT model data to trigger further DT case generation, a closed loop can be formed for the entire network management and control process, and during the life cycle of the DT model data, generation of DT cases and determination of target analysis results can be continuously performed, thereby effectively improving the dynamic detection capability.

In addition, referring to FIG. 8, in an embodiment, after S140 in the embodiment shown in FIG. 1 is executed, the method further includes, but not limited to, a following step.

At S810, network status information of the physical network after the network management and control is implemented is acquired and displayed.

It should be noted that the acquired network status information may be displayed through the OTN intelligent network management and control APP described in the embodiment in FIG. 6, or may be displayed through another device communicatively connected to the network management and control system, as long as the user can directly view the current operational status of the physical network. It should be noted that the network status information may be content related to the physical network. For example, for an OTN systems, the network status information may include a real-time OTN network topology, OTN network service running status, network performance status, network resource availability status, etc. The specific content to be displayed may be selected according to actual requirements.

It can be understood that the network status information may be acquired and displayed in real time, or may be displayed through the OTN intelligent network management and control APP according to a requirement of the user, which is not limited in this embodiment.

Figure 9:
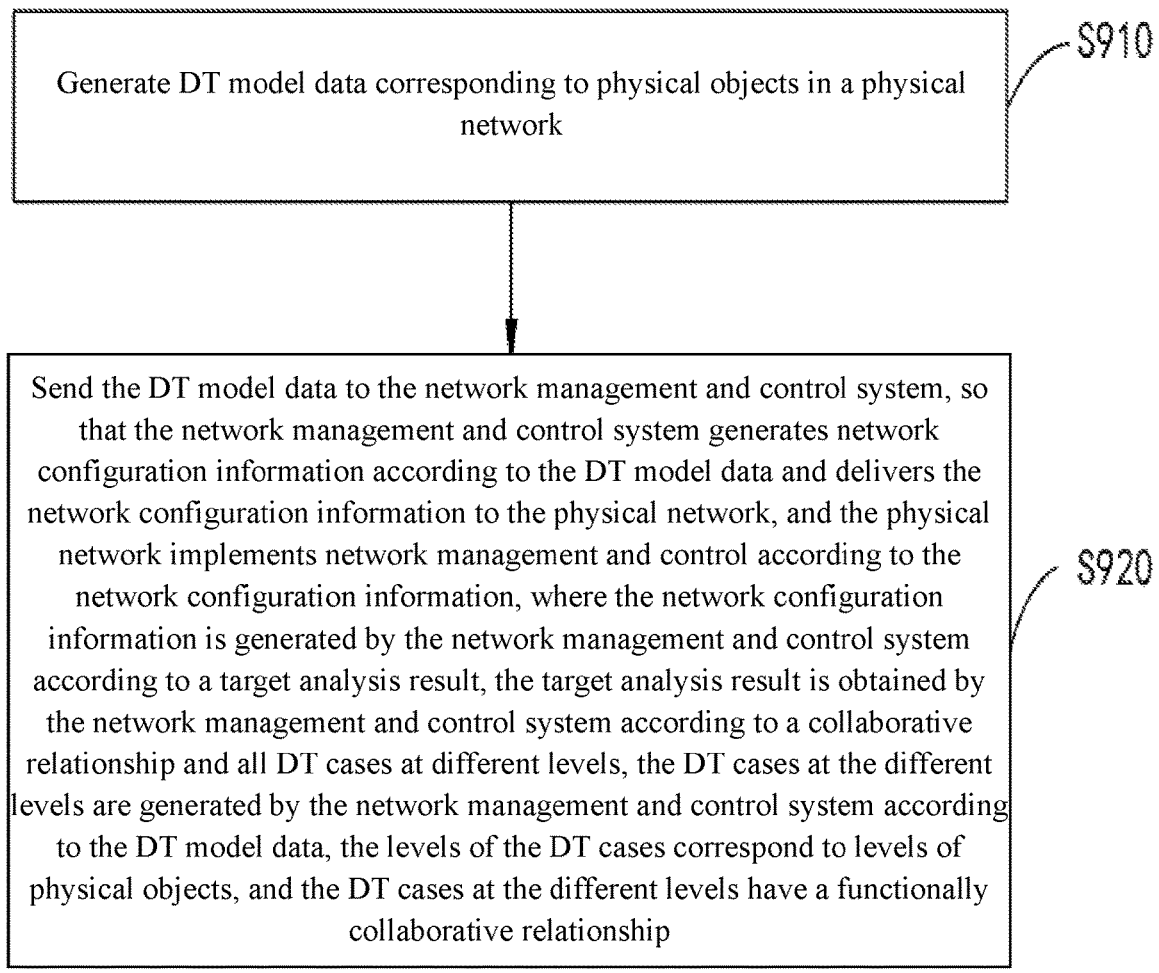
FIG. 9 is a flowchart of a network management and control method applied to a data acquisition apparatus according to another embodiment of the present disclosure.

As shown in FIG. 9, an embodiment of the present disclosure provides a network management and control method, which is applied to a data acquisition apparatus communicatively connected to a network management and control system. The network management and control method includes, but not limited to, the following steps.

At S910, DT model data corresponding to physical objects in a physical network is generated.

It should be noted that for the network management and control system, an SDON can implement the management and control of the physical network, for example, implement dynamic management and control of end-to-end OTN services, network topology management, OTN service fault protection, and other functions in an OTN system. However, the SDON cannot directly acquire DT model data from the physical network. Therefore, the data acquisition apparatus in the embodiments of the present disclosure may be an apparatus for acquiring data from the physical network and generating DT model data. The apparatus may be any entity that can realize corresponding functions, which is not limited in this embodiment.

It should be noted that the data acquisition apparatus may acquire DT model data from a physical OTN network according to a requirement of an HDTON case orchestrator, and report the acquired DT model data to the HDTON case orchestrator, so that each DT case container generate a DT case according to the DT model data.

At S920, the DT model data is sent to the network management and control system, so that the network management and control system generates network configuration information according to the DT model data and delivers the network configuration information to the physical network, and the physical network implements network management and control according to the network configuration information, where the network configuration information is generated by the network management and control system according to a target analysis result, the target analysis result is obtained by the network management and control system according to a collaborative relationship and all DT cases at different levels, the DT cases at the different levels are generated by the network management and control system according to the DT model data, the levels of the DT cases correspond to levels of physical objects, and the DT cases at the different levels have a functionally collaborative relationship.

It should be noted that for the method and principle of generating DT cases and network configuration information by the network management and control system, reference may be made to the description of the embodiment shown in FIG. 1. Similarly, for the specific definitions of the level and the collaborative relationship, reference may also be made to the description of the embodiment shown in FIG. 1. The details will not be repeated herein for simplicity of description.

Figure 10:
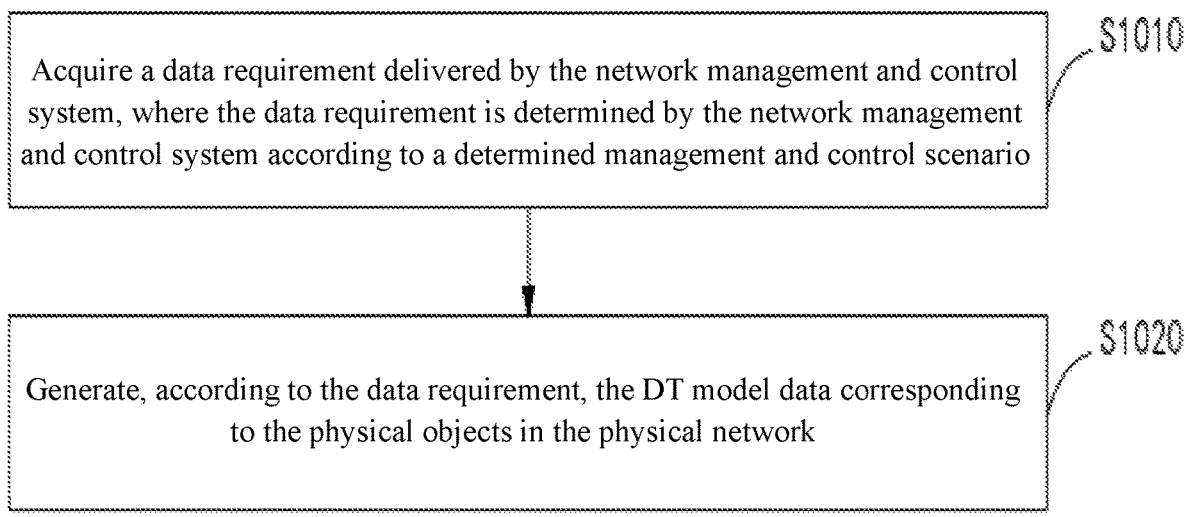
FIG. 10 is a flowchart of generating DT model data according to another embodiment of the present disclosure.

In addition, referring to FIG. 10, in an embodiment, S910 in the embodiment shown in FIG. 9 further includes, but not limited to, the following steps.

At S1010, a data requirement delivered by the network management and control system is acquired, where the data requirement is determined by the network management and control system according to a management and control scenario determined.

At S1020, the DT model data corresponding to the physical objects in the physical network is generated according to the data requirement.

It can be understood that for the specific method and principle of generating the data requirement, reference may be made to the description of the embodiment shown in FIG. 2. The details will not be repeated herein for simplicity of description.

It should be noted that the data requirement may be delivered to the data acquisition apparatus by the HDTON case orchestrator of the network management and control system. The data acquisition apparatus determines a physical model of physical objects in the physical network by utilizing the DT technology according to the specific data requirement, acquires required parameters and attributes from the physical model, and extracts DT model data from the acquired parameters and attributes, to ensure that the DT model data is consistent with the parameters of the physical objects in the physical network.

Figure 11:
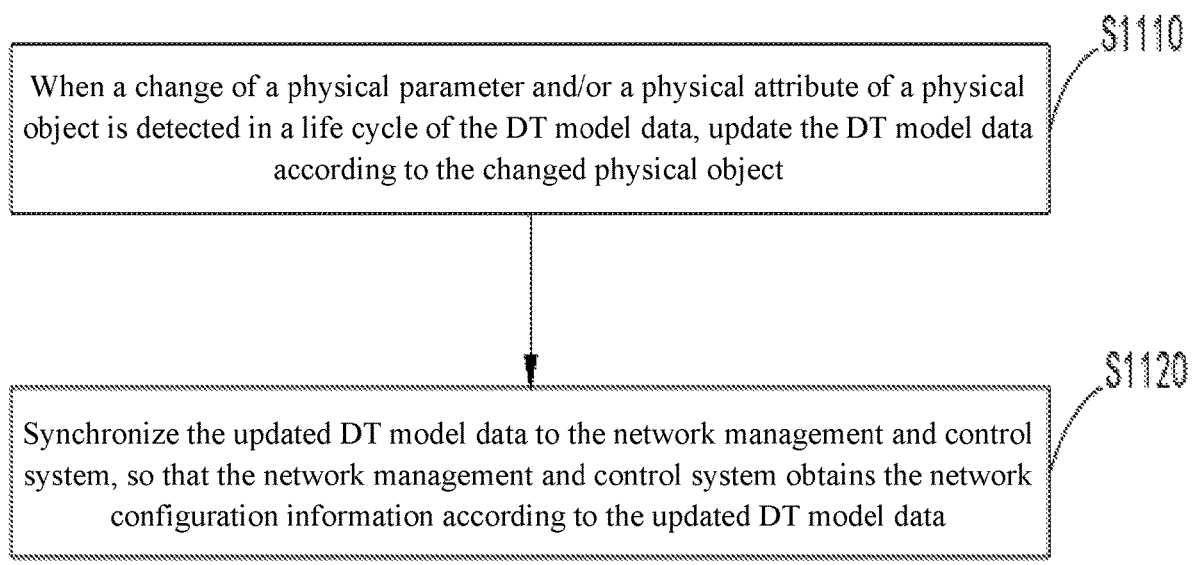
FIG. 11 is a flowchart of updating DT model data according to another embodiment of the present disclosure.

In addition, referring to FIG. 11, in an embodiment, after S1020 in the embodiment shown in FIG. 10 is executed, the method further includes, but not limited to, the following steps.

At S1110, when a change of a physical parameter and/or a physical attribute of a physical object is detected in a life cycle of the DT model data, the DT model data is updated according to the changed physical object.

At S1120, the updated DT model data is synchronized to the network management and control system, so that the network management and control system obtains the network configuration information according to the updated DT model data.

It should be noted that the life cycle of the DT model data may be from determination of the management and control scenario to completion of the network management and control on the physical network, or may be a set running time. The specific form may be selected according to actual requirements, as long as the DT model data is consistent with the corresponding physical model throughout the life cycle.

It can be understood that, the real-time synchronization of the DT model data in the life cycle of the DT model data ensures that the acquired DT model data can reflect real-time parameters of the physical objects in the current physical network, so that the obtained target analysis result can reflect an actual network status, thereby ensuring the dynamic detection capability of the network.

It can be understood that the change of the physical parameter and/or the physical attribute may be a change in numerical value, a change in data collected in a collection period, or addition or deletion of an attribute, etc., which will not be described in detail in this embodiment.

The technical schemes of the embodiments of the present disclosure are further described below through two example management and control scenarios and with reference to a structure of an OTN system shown in FIG. 12.

Figure 12:
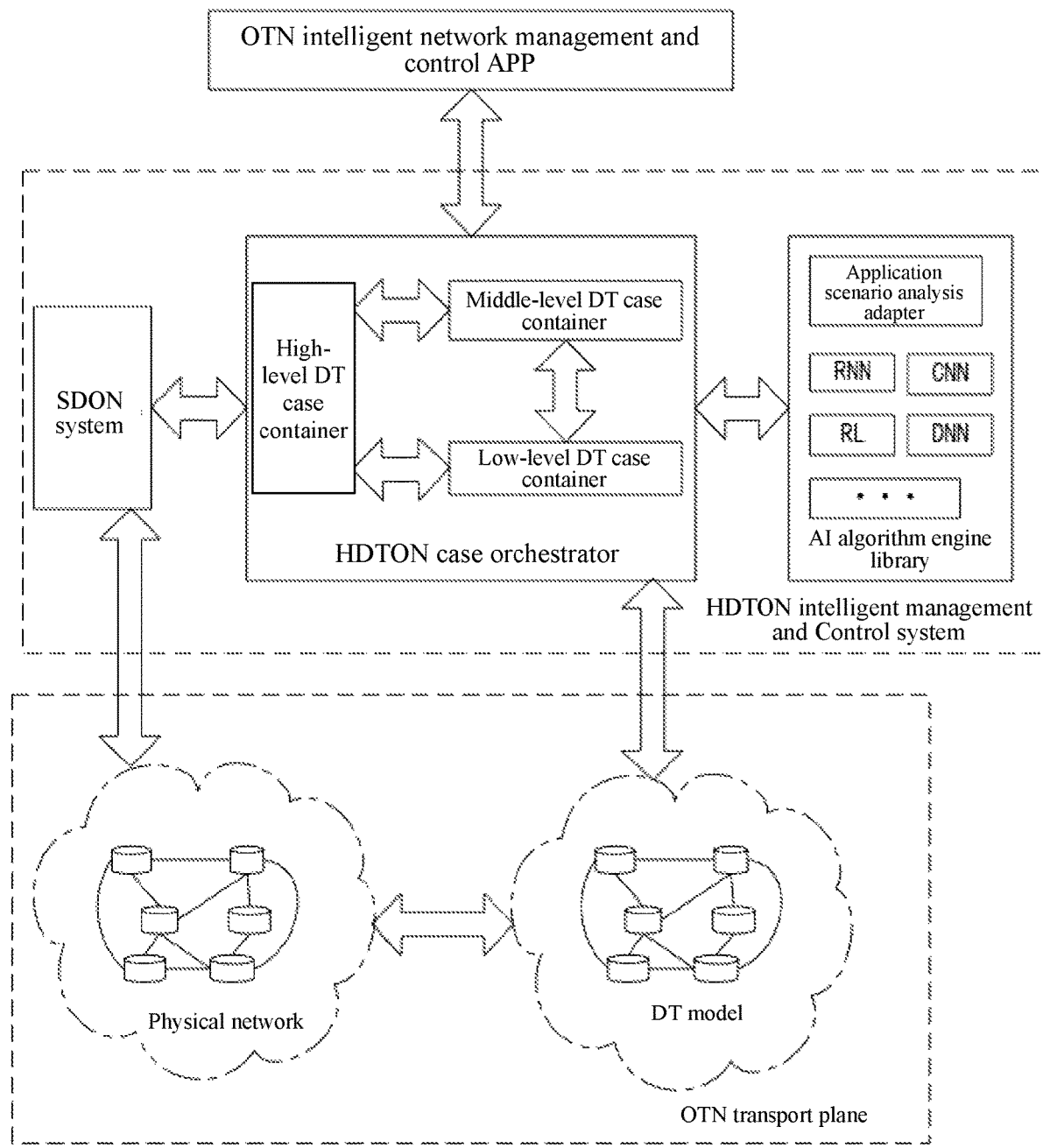
FIG. 12 is a structural diagram of an Optical Transport Network (OTN) system using the network management and control method according to another embodiment of the present disclosure.

It should be noted that the OTN system shown in FIG. 12 includes an OTN transport plane and an HDTON intelligent management and control system. In addition, an OTN intelligent network management and control APP is provided to communicatively connect to the HDTON intelligent management and control system. An SDON system, an HDTON case orchestrator, and an AI algorithm engine library are set in the HDTON intelligent management and control system. A high-level DT case container, a middle-level DT case container, and a low-level DT case container are preset in the HDTON case orchestrator. The AI algorithm engine library includes an application scenario analysis adapter and several pre-trained AI algorithms. The OTN transport plane includes a physical network and a DT model. The physical network includes a plurality of physical devices. A digital model corresponding to the physical devices is built in the DT model. It should be noted that the components may be physical apparatus or may be functional modules with corresponding functions. The specific implementation of the components is not limited in this embodiment. In addition, the selection of the above apparatus is for the convenience of description and is not intended to limit the technical schemes of the present disclosure.

Figure 13:
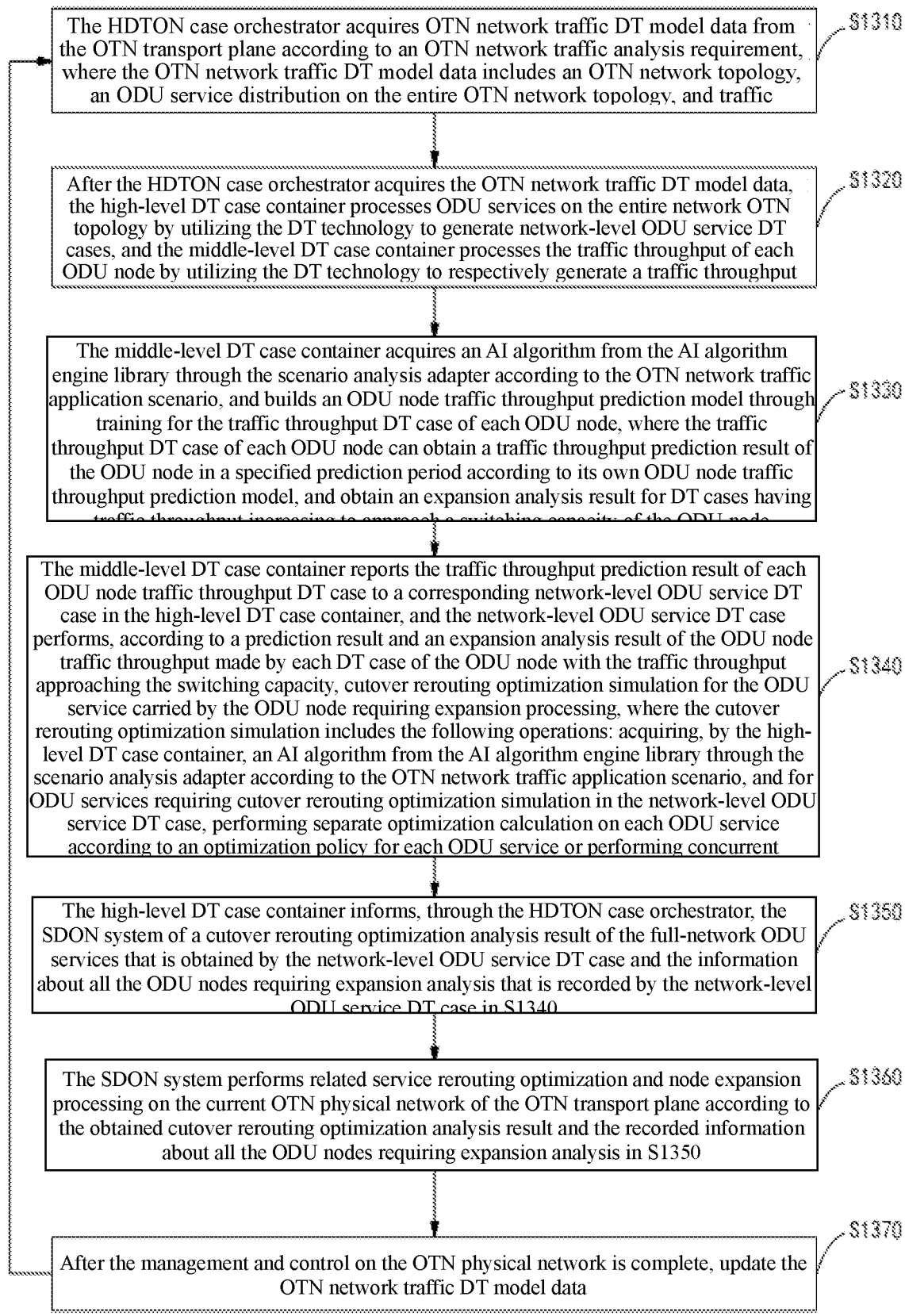
FIG. 13 is a flowchart of Example One according to another embodiment of the present disclosure.
Figure 14:
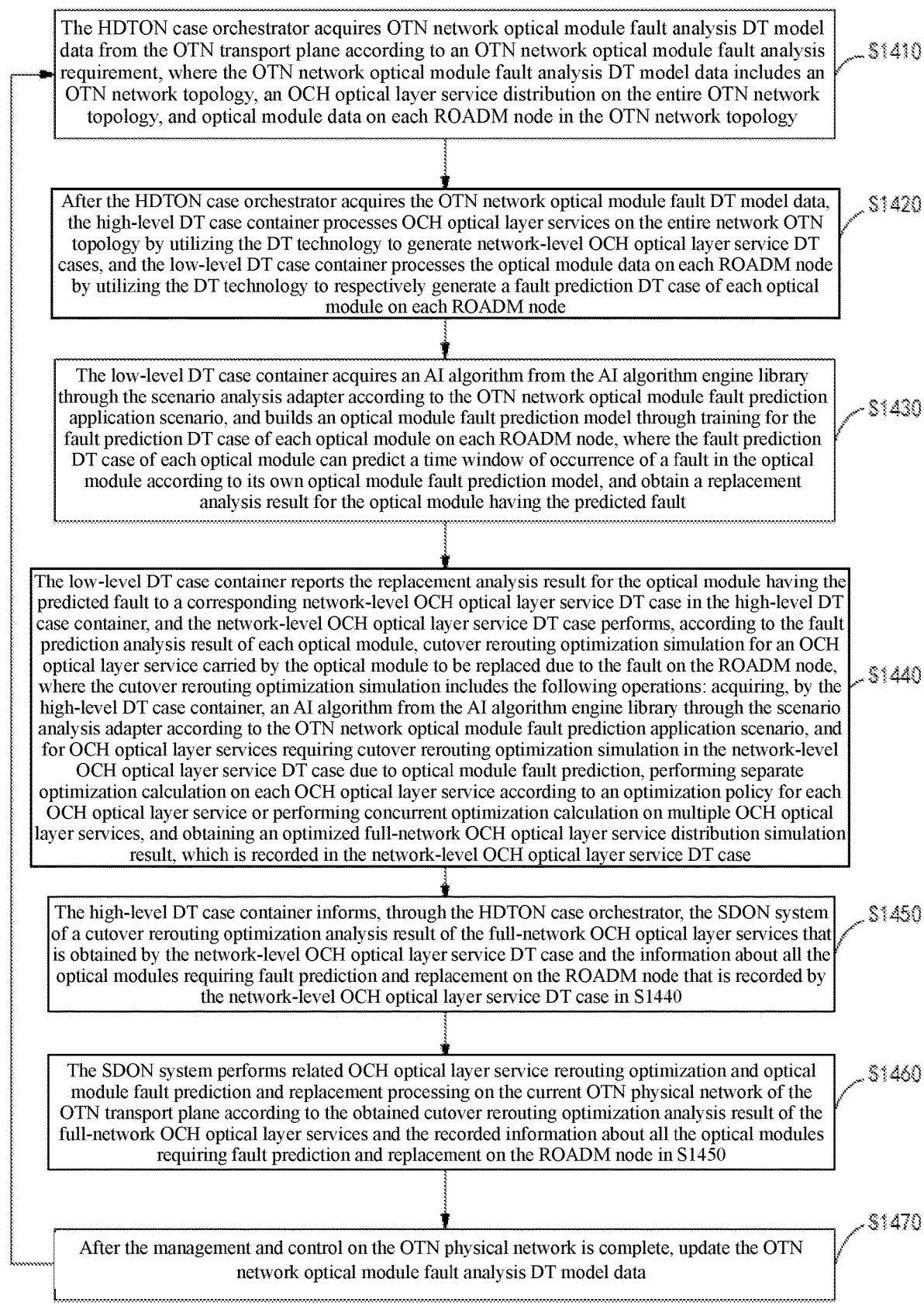
FIG. 14 is a flowchart of Example Two according to another embodiment of the present disclosure.

Example One: In an OTN network traffic analysis application scenario, referring to FIG. 13, the network management and control method includes, but not limited to, the following steps.

At S1310, the HDTON case orchestrator acquires OTN network traffic DT model data from the OTN transport plane according to an OTN network traffic analysis requirement, where the OTN network traffic DT model data includes an OTN network topology, an ODU service distribution on the entire OTN network topology, and traffic throughput of each ODU node.

At S1320, after the HDTON case orchestrator acquires the OTN network traffic DT model data, the high-level DT case container processes ODU services on the entire network OTN topology by utilizing the DT technology to generate network-level ODU service DT cases, and the middle-level DT case container processes the traffic throughput of each ODU node by utilizing the DT technology to generate a traffic throughput DT case of each ODU node.

At S1330, the middle-level DT case container acquires an AI algorithm from the AI algorithm engine library through the scenario analysis adapter according to the OTN network traffic application scenario, and builds an ODU node traffic throughput prediction model through training for the traffic throughput DT case of each ODU node, where the traffic throughput DT case of each ODU node can obtain a traffic throughput prediction result of the ODU node in a specified prediction period according to its own ODU node traffic throughput prediction model, and obtain an expansion analysis result for DT cases having traffic throughput increasing to approach a switching capacity of the ODU node.

At S1340, the middle-level DT case container reports the traffic throughput prediction result of each ODU node traffic throughput DT case to a corresponding network-level ODU service DT case in the high-level DT case container, and the network-level ODU service DT case performs, according to a prediction result and an expansion analysis result of the ODU node traffic throughput made by each DT case of the ODU node with the traffic throughput approaching the switching capacity, cutover rerouting optimization simulation for the ODU service carried by the ODU node requiring expansion processing, where the cutover rerouting optimization simulation includes the following operations: acquiring, by the high-level DT case container, an AI algorithm from the AI algorithm engine library through the scenario analysis adapter according to the OTN network traffic application scenario, and for ODU services requiring cutover rerouting optimization simulation in the network-level ODU service DT case, performing separate optimization calculation on each ODU service according to an optimization policy for each ODU service or performing concurrent optimization calculation on multiple ODU services, and obtaining an optimized full-network ODU service distribution simulation result, which is recorded in the network-level ODU service DT case.

At S1350, the high-level DT case container informs, through the HDTON case orchestrator, the SDON system of a cutover rerouting optimization analysis result of the full-network ODU services that is obtained by the network-level ODU service DT case and the information about all the ODU nodes requiring expansion analysis that is recorded by the network-level ODU service DT case in S1340.

At S1360, the SDON system performs related service rerouting optimization and node expansion processing on the current OTN physical network of the OTN transport plane according to the obtained cutover rerouting optimization analysis result and the recorded information about all the ODU nodes requiring expansion analysis in S1350.

At S1370, after the management and control on the OTN physical network is complete, the OTN network traffic DT model data is updated, and S1310 is executed again.

It should be noted that the traffic throughput may include uplink/downlink traffic and pass-through traffic of the ODU node, which may be selected according to actual requirements.

It can be understood that the traffic throughput prediction result may be a traffic value in any period of time, for example, an average and peak of traffic throughputs in the next 15 days or an average and peak of traffic throughputs in the next month, which is not limited in this embodiment.

It should be noted that the cutover rerouting optimization analysis result obtained in S1340 may be an optimal time window for rerouting optimization, and service rerouting deployment in this time window has the least impact on the operation of the existing OTN physical network of the OTN transport plane.

Example Two: In an OTN network optical module fault prediction application scenario, the network management and control method includes, but not limited to, the following steps.

At S1410, the HDTON case orchestrator acquires OTN network optical module fault analysis DT model data from the OTN transport plane according to an OTN network optical module fault analysis requirement, where the OTN network optical module fault analysis DT model data includes an OTN network topology, an OCH optical layer service distribution on the entire OTN network topology, and optical module data on each ROADM node in the OTN network topology.

At S1420, after the HDTON case orchestrator acquires the OTN network optical module fault DT model data, the high-level DT case container processes OCH optical layer services on the entire network OTN topology by utilizing the DT technology to generate network-level OCH optical layer service DT cases, and the low-level DT case container processes the optical module data on each ROADM node by utilizing the DT technology to respectively generate a fault prediction DT case of each optical module on each ROADM node.

At S1430, the low-level DT case container acquires an AI algorithm from the AI algorithm engine library through the scenario analysis adapter according to the OTN network optical module fault prediction application scenario, and builds an optical module fault prediction model through training for the fault prediction DT case of each optical module on each ROADM node, where the fault prediction DT case of each optical module can predict a time window of occurrence of a fault in the optical module according to its own optical module fault prediction model, and obtain a replacement analysis result for the optical module having the predicted fault.

At S1440, the low-level DT case container reports the replacement analysis result for the optical module having the predicted fault to a corresponding network-level OCH optical layer service DT case in the high-level DT case container, and the network-level OCH optical layer service DT case performs, according to the fault prediction analysis result of each optical module, cutover rerouting optimization simulation for an OCH optical layer service carried by the optical module to be replaced due to the fault on the ROADM node, where the cutover rerouting optimization simulation includes the following operations: acquiring, by the high-level DT case container, an AI algorithm from the AI algorithm engine library through the scenario analysis adapter according to the OTN network optical module fault prediction application scenario, and for OCH optical layer services requiring cutover rerouting optimization simulation in the network-level OCH optical layer service DT case due to optical module fault prediction, performing separate optimization calculation on each OCH optical layer service according to an optimization policy for each OCH optical layer service or performing concurrent optimization calculation on multiple OCH optical layer services, and obtaining an optimized full-network OCH optical layer service distribution simulation result, which is recorded in the network-level OCH optical layer service DT case.

At S1450, the high-level DT case container informs, through the HDTON case orchestrator, the SDON system of a cutover rerouting optimization analysis result of the full-network OCH optical layer services that is obtained by the network-level OCH optical layer service DT case and the information about all the optical modules requiring fault prediction and replacement on the ROADM node that is recorded by the network-level OCH optical layer service DT case in S1440.

At S1460, the SDON system performs related OCH optical layer service rerouting optimization and optical module fault prediction and replacement processing on the current OTN physical network of the OTN transport plane according to the obtained cutover rerouting optimization analysis result of the full-network OCH optical layer services and the recorded information about all the optical modules requiring fault prediction and replacement on the ROADM node in S1450.

At S1470, after the management and control on the OTN physical network is complete, the OTN network optical module fault analysis DT model data is updated, and S1410 is executed again.

It should be noted that the optical module data on each ROADM node may be modeling data for fault prediction, for example, input and output powers of the optical module, a bias current of a laser emitter, temperature of the optical module, etc., which is not limited herein.

It can be understood that, the traffic throughput prediction result may be an optimal time window for rerouting optimization, and service rerouting deployment in this time window has the least impact on the operation of the existing OTN physical network of the OTN transport plane.

Figure 15:
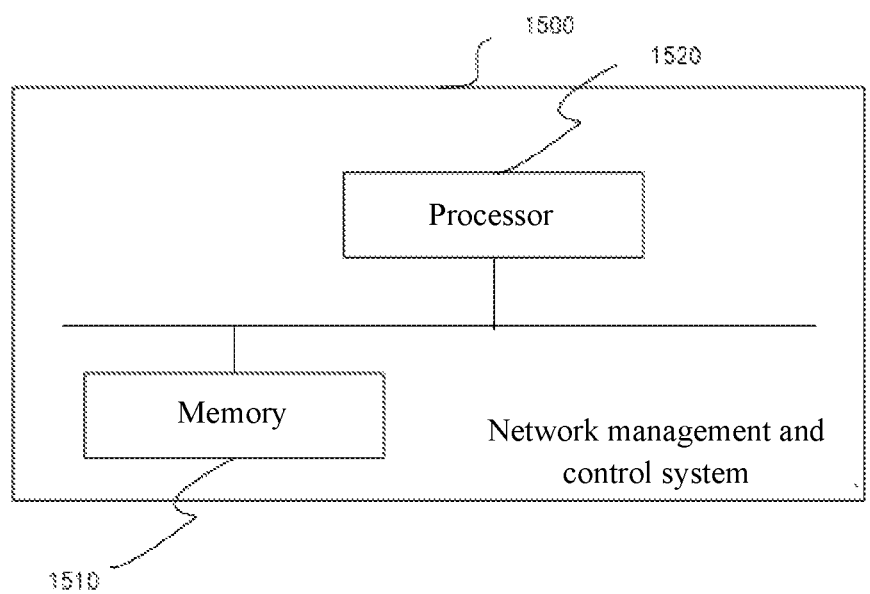
FIG. 15 is a block diagram of a network management and control system according to another embodiment of the present disclosure.

In addition, referring to FIG. 15, an embodiment of the present disclosure provides a network management and control system 1500, including a memory 1510, a processor 1520, and a computer program stored in the memory 1510 and executable by the processor 1520.

The processor 1520 and the memory 1510 may be connected by a bus or in other ways.

The non-transitory software program and instructions required to implement the network management and control method of the foregoing embodiments are stored in the memory 1510 which, when executed by the processor 1520, cause the processor 1520 to implement the network management and control method applied to the network management and control system 1500 of the foregoing embodiments, for example, implement the method steps S110 to S140 in FIG. 1, the method steps S210 to S220 in FIG. 2, the method step S310 in FIG. 3, the method steps S410 to S420 in FIG. 4, the method steps S510 to S520 in FIG. 5, the method steps S610 to S620 in FIG. 6, the method step S710 in FIG. 7, or the method step S810 in FIG. 8.

An embodiment of the present disclosure includes: acquiring DT model data corresponding to physical objects in a physical network; generating, according to the DT model data, DT cases at different levels, where the levels of the DT cases correspond to levels of the physical objects, and the DT cases at different levels have a functionally collaborative relationship; obtaining a target analysis result according to the collaborative relationship and all the DT cases; and generating network configuration information according to the target analysis result, and delivering the network configuration information to the physical network so that the physical network implements network management and control according to the network configuration information. According to the scheme provided by the embodiments of the present disclosure, network management and control can be implemented according to the DT cases at different levels and the collaborative relationship, thereby improving the dynamic detection capability and the digital analysis capability of the network system.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

In addition, an embodiment of the present disclosure provides a computer-readable storage medium, storing a computer-executable instructions which, when executed by a processor or controller, for example, by a processor in the embodiment described above, causes the processor to implement the network management and control method applied to a network management and control system in the above embodiments, for example, implement the method steps S110 to S140 in FIG. 1, the method steps S210 to S220 in FIG. 2, the method step S310 in FIG. 3, the method steps S410 to S420 in FIG. 4, the method steps S510 to S520 in FIG. 5, the method steps S610 to S620 in FIG. 6, the method step S710 in FIG. 7, or the method step S810 in FIG. 8; or, when executed by a processor in the embodiment described above, causes the processor to implement the network management and control method applied to a data acquisition apparatus in the above embodiments, for example, implement the method steps S910 to S920 in FIG. 9, the method steps S1010 to S1020 in FIG. 10, and the method steps S1110 to S1120 in FIG. 11. Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A network management and control method, which is applied to a network management and control system, the network management and control method comprising:
acquiring Digital Twin (DT) model data corresponding to physical objects in a physical network;
generating, according to the DT model data, DT cases at different levels, wherein the levels of the DT cases correspond to levels of the physical objects, and the DT cases at different levels have a functionally collaborative relationship;
obtaining a target analysis result according to the collaborative relationship and all the DT cases; and
generating network configuration information according to the target analysis result, and delivering the network configuration information to the physical network so that the physical network implements network management and control according to the network configuration information;
wherein generating, according to the DT model data, the DT cases at different levels comprises:
generating, according to the DT model data and levels of the physical objects, the DT cases in target DT case containers having different container levels, wherein the target DT case containers are determined from preset DT case containers according to a management and control scenario and the levels of the physical objects, wherein the target DT case containers are configured for generating and managing DT cases, and wherein the DT cases generated by the DT case containers having different container levels correspond to the different container levels.

2. The method of claim 1, wherein acquiring DT model data corresponding to physical objects in a physical network comprises:
determining the management and control scenario, and determining a data requirement according to the management and control scenario; and
acquiring, according to the data requirement, the DT model data corresponding to the physical objects in the physical network.

3. The method of claim 2, wherein obtaining a target analysis result according to the collaborative relationship and all the DT cases comprises:
performing, according to the collaborative relationship and the container levels corresponding to the target DT case containers, Artificial Intelligence (AI) algorithm-based processing on a DT case generated by a target DT case container having a lower container level to obtain an intermediate analysis result;
reporting the intermediate analysis result to a target DT case container having a higher container level; and performing, according to the intermediate analysis result, the AI algorithm-based processing on a DT case generated by the target DT case container having the higher container level to obtain a collaborative analysis result; and
determining a collaborative analysis result obtained from a target DT case container having a highest container level as the target analysis result.

4. The method of claim 3, wherein the AI algorithm-based processing comprises:
determining a target AI algorithm from a preset AI algorithm library according to the management and control scenario; and
analyzing and processing the DT case according to the target AI algorithm.

5. The method of claim 2, wherein the management and control scenario comprises:
acquiring a current operational status of the physical network, and determining the management and control scenario according to the operational status and preset management information.

6. The method of claim 1, wherein prior to delivering the network configuration information to the physical network so that the physical network implements network management and control according to the network configuration information, the method further comprises:
regenerating, in response to acquiring new DT model data reported by the physical network after performing network management and control according to the network configuration information, the network configuration information according to the new DT model data.

7. The method of claim 1, wherein after delivering the network configuration information to the physical network so that the physical network implements network management and control according to the network configuration information, the method further comprises:
acquiring and displaying network status information of the physical network after the network management and control is implemented.

8. A network management and control method, which is applied to a data acquisition apparatus communicatively connected to a network management and control system, the network management and control method comprising:
generating Digital Twin (DT) model data corresponding to physical objects in a physical network; and
sending the DT model data to the network management and control system, so that the network management and control system generates network configuration information according to the DT model data, and delivering the network configuration information to the physical network, so that the physical network implements network management and control according to the network configuration information, wherein the network configuration information is generated by the network management and control system according to a target analysis result, the target analysis result is obtained by the network management and control system according to a collaborative relationship and all DT cases at different levels, the DT cases at the different levels are generated by the network management and control system according to the DT model data, the levels of the DT cases correspond to levels of physical objects, and the DT cases at the different levels have a functionally collaborative relationship;
wherein the DT cases are generated in target DT case containers having different container levels according to the DT model data and levels of the physical objects, wherein the target DT case containers are determined from preset DT case containers according to a management and control scenario and the levels of the physical objects, wherein the target DT case containers are configured for generating and managing DT cases, and wherein the DT cases generated by the DT case containers having different container levels correspond to the different container levels.

9. The method of claim 8, wherein generating DT model data corresponding to physical objects in a physical network comprises:
acquiring a data requirement delivered by the network management and control system, wherein the data requirement is determined by the network management and control system according to the management and control scenario; and
generating, according to the data requirement, the DT model data corresponding to the physical objects in the physical network.

10. The method of claim 9, wherein after generating DT model data corresponding to physical objects in a physical network, the method further comprises:
updating, in response to detecting a change of a physical parameter and a physical attribute of a physical object in a life cycle of the DT model data, the DT model data according to the changed physical object; and
synchronizing the updated DT model data to the network management and control system, so that the network management and control system obtains the network configuration information according to the updated DT model data.

11. A network management and control system, comprising:
a memory,
a processor, and
a computer program stored in the memory and executable by the processor which, when executed by the processor, causes the processor to perform a network management and control method which is applied to a network management and control system, the network management and control method comprising:
acquiring Digital Twin (DT) model data corresponding to physical objects in a physical network;
generating, according to the DT model data, DT cases at different levels, wherein the levels of the DT cases correspond to levels of the physical objects, and the DT cases at different levels have a functionally collaborative relationship;
obtaining a target analysis result according to the collaborative relationship and all the DT cases; and
generating network configuration information according to the target analysis result, and delivering the network configuration information to the physical network so that the physical network implements network management and control according to the network configuration information;
wherein generating, according to the DT model data, the DT cases at different levels comprises:
generating, according to the DT model data and levels of the physical objects, the DT cases in target DT case containers having different container levels, wherein the target DT case containers are determined from preset DT case containers according to a management and control scenario and the levels of the physical objects, wherein the target DT case containers are configured for generating and managing DT cases, and wherein the DT cases generated by the DT case containers having different container levels correspond to the different container levels.

12. A network system, comprising a network management and control system and a data acquisition apparatus, wherein the network management and control system is communicatively connected to the data acquisition apparatus, the network management and control system is configured for performing the network management and control method of claim 1.

13. A non-transitory computer-readable storage medium, storing a computer-executable instruction which, when executed by a processor, causes the processor to perform the network management and control method of claim 1.

14. The method of claim 2, wherein the management and control scenario comprises:
acquiring a management and control requirement, and determining the management and control scenario according to the management and control requirement.

15. The method of claim 9, wherein after generating DT model data corresponding to physical objects in a physical network, the method further comprises:
updating, in response to detecting a change of a physical parameter or a physical attribute of a physical object in a life cycle of the DT model data, the DT model data according to the changed physical object; and
synchronizing the updated DT model data to the network management and control system, so that the network management and control system obtains the network configuration information according to the updated DT model data.

16. The network management and control system of claim 11, wherein acquiring DT model data corresponding to physical objects in a physical network comprises:
determining a management and control scenario, and determining a data requirement according to the management and control scenario; and
acquiring, according to the data requirement, the DT model data corresponding to the physical objects in the physical network.

17. A network system, comprising a network management and control system and a data acquisition apparatus, wherein the network management and control system is communicatively connected to the data acquisition apparatus, the data acquisition apparatus is configured for performing the network management and control method of claim 8.

18. A non-transitory computer-readable storage medium, storing a computer-executable instruction which, when executed by a processor, causes the processor to perform the network management and control method of claim 8.

* * * * *